No. 624,490. Patented May 9, 1899.
E. G. HOFFMANN.
DEVICE FOR HOLDING CIRCULAR CUTTERS.
(Application filed Mar. 5, 1898.)
(No Model.) 2 Sheets—Sheet 1.

WITNESSES. INVENTOR.

No. 624,490. Patented May 9, 1899.
E. G. HOFFMANN.
DEVICE FOR HOLDING CIRCULAR CUTTERS.
(Application filed Mar. 5, 1898.)
(No Model.) 2 Sheets—Sheet 2.

WITNESSES.
F. M. Eggleston.
A. H. Jesbera.

INVENTOR.
Ernst Gustav Hoffmann
by Redding, Kiddle & Greeley
attys

UNITED STATES PATENT OFFICE.

ERNST GUSTAV HOFFMANN, OF LONDON, ENGLAND.

DEVICE FOR HOLDING CIRCULAR CUTTERS.

SPECIFICATION forming part of Letters Patent No. 624,490, dated May 9, 1899.

Application filed March 5, 1898. Serial No. 672,753. (No model.)

*To all whom it may concern:*

Be it known that I, ERNST GUSTAV HOFFMANN, a subject of the German Emperor, residing at London, England, have invented a certain new and useful Improvement in Devices for Holding Circular Cutters, of which the following is a specification.

This invention relates to means for holding and adjusting circular cutters having a cutting edge adapted to be presented to a rotating body to cut or shape same, as in a lathe, the invention being, however, particularly applicable for use in connection with an automatic ball-making machine in which small balls or like articles are turned from a rotating wire. While the employment of circular cutters has long been recognized as a great advantage, their general use has in many cases been delayed or altogether prevented on account of the difficulty experienced in securing them in a substantial and practical manner in the slide-rest of the machine and because the adjustment of the cutters in relation to the work it is acting upon offers great obstacles. In machines such as the ball-making machine referred to an additional difficulty is experienced in so mounting the cutter upon the slide-rest that the screws or eccentrics used to fasten it upon the rest should not in any way strain or spring the casting composing the rest. Inasmuch as the machine has to work so accurately, it is most important that its slide-rest may move freely and at the same time without any play, and since the slightest straining of the slide would interfere seriously with its free movement it is of the greatest importance that the means for securing the cutter upon the slide be of such a construction that they do not in the slightest degree cause straining or springing of the slide.

Figure 3:
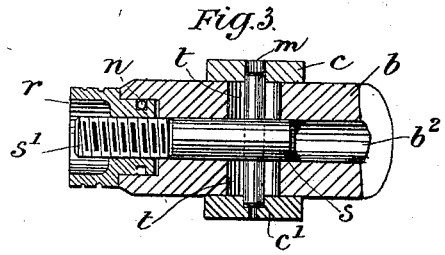
Figure 1:
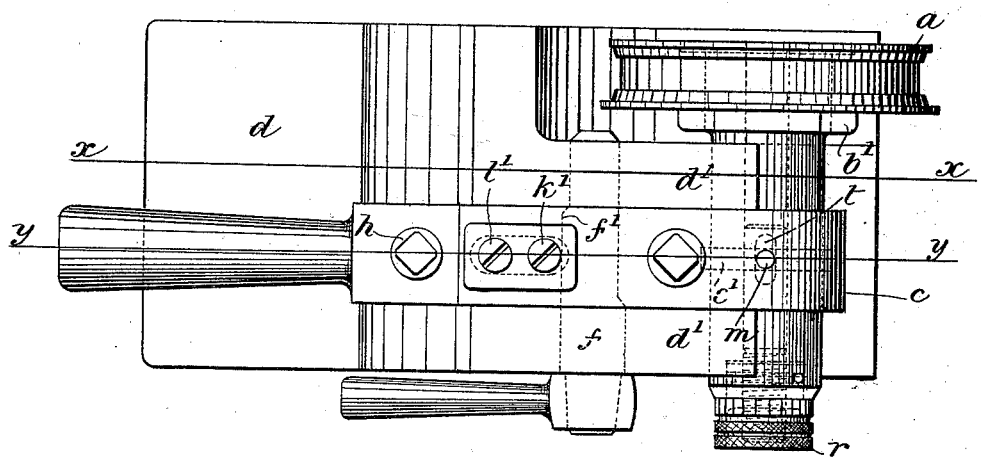
Figure 2:
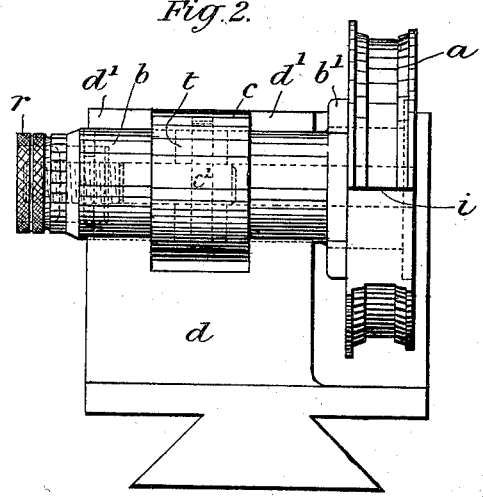
Figure 4:
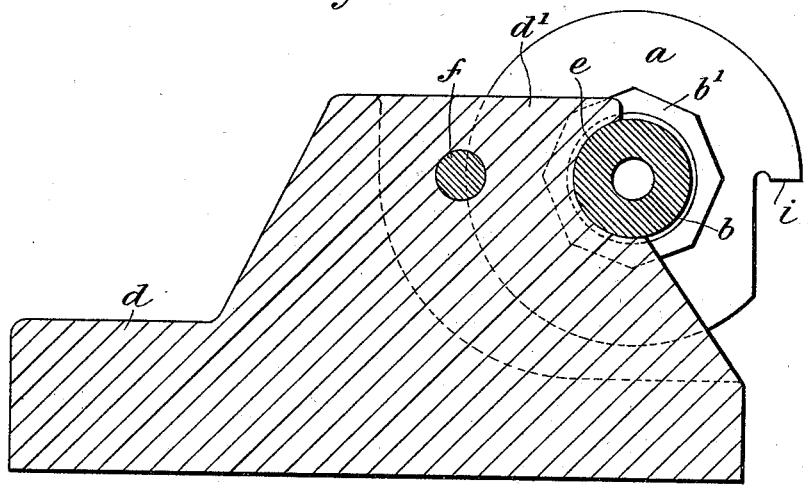
Figure 5:
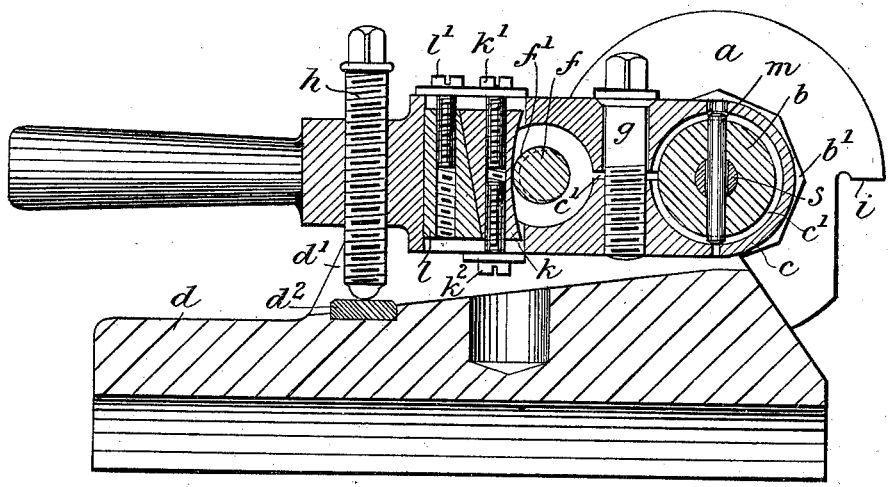

In the accompanying drawings, Figure 1 is a plan of a slide-rest and a circular cutter constructed according to my invention. Fig. 2 is an end view. Fig. 3 is a longitudinal section through a part of the mandrel to which the cutter is attached. Fig. 4 is a section on line $xx$, Fig. 1; and Fig. 5 is a section on line $yy$ of same figure.

The cutter $a$ is shown as adapted for making rivets out of a rotating wire; but its shape is immaterial to the present invention. It is secured to and carried by a mandrel $b$ and a clamp or holder $c$ in position in a slide $d$. The cutter is secured upon its mandrel by a nut $b'$, and the mandrel beds or rests in semicircular grooves $e$, formed in the ends of projections $d'$ $d'$ of the slide $d$, and is drawn tight in said grooves by means of the lever-shaped handle or clamp $c$ and an eccentric-pin $f$, which passes through holes in the projections $d'$ $d'$ and through a larger hole in the clamp, which is situated between said projections. The pin has a part $f'$, which is eccentric to the rest of the body of the pin and the holes in the projections $d'$ $d'$, and this part occupies a position in the hole through the clamp $c$. The clamp $c$ is split at $c'$, Fig. 5, and a screw $g$ passes through it at this point to tighten the clamp upon the mandrel $b$. The clamp also has a screw $h$, passing through it at the end and bearing on a hardened block $d^2$ in slide $d$, a wedge-block $k$, having a curved surface for the eccentric $f'$ to bear against, screws $k'$ $k^2$ for adjusting same, and a wedge-block $l$ at the rear of block $k$ for altering the position of same laterally. The adjustment of the cutter's edge $i$ in a vertical direction or, rather, in a circular direction around its own center, is effected after first loosening eccentric-pin $f$ by screw $h$, the clamp being raised at the handle end by turning the screw into same. When the limit of adjustment is reached by reason of the number of times the cutter has been ground, it is necessary to change the position of the cutter in clamp $c$, so as to permit the screw $h$ to be almost entirely withdrawn and the clamp $c$ to be brought down again as close upon the slide $d$ as possible. One of the objects of this construction is to obviate the readjustment of the cutter in its clamp $c$ as little as possible, because such adjustment is always more or less interfering with the accurate setting of the cutter, and it is for this reason that it is desirable to be able to grind off the cutter a good deal before it is really necessary to reset it in position in connection with the clamp $c$.

Assuming that the clamp is at its highest point and that the position must be changed, all that is necessary to effect the change is to loosen screw $g$, withdraw screw $h$, and then force the clamp $c$ down upon the slide while rotating the mandrel $b$ within the clamp $c$ to the required extent. As soon as this is accomplished screw $g$ is again fastened and the fine adjustment is effected by the screw $h$.

As already explained, the lever-shaped clamp $c$ is fastened to the slide by the eccentric $f'$, which draws the mandrel $b$ against its semicircular seats on the slide. In consequence of the changing position of the clamp $c$, resulting from the continuous grinding of the cutter, it is impossible to have a fixed point where the eccentric $f'$ would in all cases bear upon the clamp $c$. In order to provide therefor means against which the eccentric $f'$ could bear no matter what the position of clamp $c$, the arrangement of wedges $l$ $k$ is employed. The curve or wedge $k$ coincides with the curve of a circle the radius of which starts from the center of the cutter and terminates at the point against which the eccentric $f'$ bears. In order to make this wedge $k$ fall absolutely in line with the true center of the just-mentioned circle, it is provided with the two screws $k'$ $k^2$, whereby it can be adjusted lower or higher, as required. Said wedge $k$, having the just-described curved face, and it being further provided with means for adjusting in a vertical direction, makes it clear that the eccentric will always find a properly-adjusted point against which it can bear no matter where the clamp $c$ is positioned. In order to provide for inaccuracy in workmanship, on the one hand, and for wear and tear upon the points of contact between the eccentric $f'$ and wedge $k$, on the other hand, the wedge $l$ has been provided. Said wedge $l$ has a screw $l'$ on one side only, by means of which it is possible to move wedge $k$ away from or to the center of the cutter, thereby permitting eccentric $f'$ to draw the clamp $c$ to the slide with more or less pressure.

In order to overcome the straining or springing of the slide when fastening the cutter upon it, as before explained, it will be noticed that the strains created by fastening the clamp $c$ are only located as between the metal itself.

The mandrel $b$ is drawn upon its semicircular seat provided upon the two extensions of the slide, and the eccentric $f$ is forced in a direction toward the seats of said mandrel, and therefore no matter what the strain between these two points the slide generally or any other part of the slide is not affected thereby.

The arrangement offers great facility in taking out the cutter, grinding it, and putting it back in exactly the same position it occupied before, and for this purpose the eccentric-pin $f$ is withdrawn and the clamp and cutter lifted out and ground without altering the position of the cutter in said clamp. All that is necessary afterward to compensate for the amount which has been ground off at $i$ is done by screwing in the screw $h$.

For very accurate work it is important to be able to accurately adjust the cutter laterally or longitudinally to the wire or material it works upon, and in order to effect such accurate adjustment quickly and without complication the device shown at Fig. 3 is employed.

The principal part of Fig. 3 is the body of the mandrel $b$, through which a hole $b^2$ is drilled in line with its axis. Within the said hole is a pin $s$, having on one end a screw-thread $s'$ and on the other a hole through which a smaller pin $m$ passes at right angles. The end $s'$ of the pin $s$ fits into a nut $r$, said nut being secured partly within the mandrel $b$ in such a manner that it cannot move one way or another longitudinally, which is effected by a pin $n$, engaging in a groove in nut $r$ and passing through mandrel $b$ at right angles to its axis. The pin $m$, which passes through the other end of pin $s$, engages internally with the clamp $c$, for which purpose a groove $c'$ is provided in said clamp, extending all around the internal surface. This is seen best at Fig. 5, which also shows how the pin $m$ can be inserted through a small hole provided on top of the clamp $c$. There is a still smaller hole at the bottom of clamp $c$. The larger hole is for the insertion of the pin $m$ and the smaller hole is for the purpose of pushing out pin $m$, but at the same time preventing it from falling through, which it otherwise would do. The mandrel $b$ is furthermore provided with a slot $t$, (shown also in Fig. 1,) wherein pin $m$ can be moved longitudinally to a limited extent. Coming now to the description of the action of these parts, it will be noticed to start with that the mandrel $b$ can turn within clamp $c$ without obstacle, because the pin $m$ will travel around the internal groove $c'$ in clamp $c$; but if nut $r$ be rotated one way or another it will force the mandrel and its cutter, by means of pin $m$, laterally, and since the nut $r$ engages with pin $s$ by means of a very fine thread and the nut $r$ being furthermore divided on its periphery with a number of divisions which will produce, in combination with the screw-thread, a direct reading of, say, one one-thousandth of an inch it follows that the lateral movement of the cutter-mandrel within the clamp $c$ can be determined by means of said micrometer-nut $r$ to a very fine degree indeed. Of course when said adjustment is used it is necessary to loosen screw $g$ as much as is necessary to permit the mandrel to move in the clamp. The cutter, with its mandrel, can be removed entirely from clamp $c$ very quickly by simply withdrawing pin $m$ through the hole on the top of clamp $c$ when said mandrel is free to be taken out of the clamp.

What is claimed is—

1. In a device for holding a circular cutter the combination with a rotatable mandrel carrying the cutter of a clamp embracing said mandrel, means for tightening the clamp and holding the mandrel in any desired position and means for holding the clamp and for moving it together with the cutter around the axial line of the latter substantially as described.

2. In a device for holding a circular cutter, a clamp for such cutter having a movement together with and around the axis of same, a slide-rest for holding the clamp, an eccentric for holding the clamp in the rest and carried by the clamp and a block having a curved face corresponding to the curve of a circle, the center of which is the center of the cutter and against which the eccentric can bear at any position of the clamp, substantially as described.

3. In a device for holding a circular cutter and in combination with the cutter and a movable clamp for holding same, a wedge-block having a curved face corresponding to the curve of a circle the center of which is the center of the cutter, an eccentric forming part of a device for holding the clamp, adapted to bear against the curved face of the wedge-block, and means for adjusting the wedge-block both horizontally and vertically, substantially as described.

4. In a device for holding a circular cutter and in combination, a mandrel carrying the cutter, a clamp in which the mandrel is held, and in which it may be turned, a pin located in a hole in said mandrel, a second pin carried by the first, a slot in the mandrel through which same passes, a groove in the clamp in which the pin engages, means for moving the pins in the mandrel so that the latter is moved longitudinally in the clamp for the purpose of adjustment and means for withdrawing one of the pins to allow the mandrel to be released from the clamp, substantially as described.

In testimony whereof I have hereunto set my hand in the presence of two subscribing witnesses.

ERNST GUSTAV HOFFMANN.

Witnesses:
ALLEN PARRY JONES,
FRED C. HARRIS.